(12) United States Patent
Ubukata et al.

(10) Patent No.: US 8,443,856 B2
(45) Date of Patent: May 21, 2013

(54) PNEUMATIC TIRE FOR MOTORCYCLE

(75) Inventors: Toru Ubukata, Kodaira (JP); Masao Azuma, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 702 days.

(21) Appl. No.: 12/524,395

(22) PCT Filed: Jan. 21, 2008

(86) PCT No.: PCT/JP2008/050684
§ 371 (c)(1),
(2), (4) Date: Jul. 24, 2009

(87) PCT Pub. No.: WO2008/090837
PCT Pub. Date: Jul. 31, 2008

(65) Prior Publication Data
US 2010/0101694 A1    Apr. 29, 2010

(30) Foreign Application Priority Data
Jan. 25, 2007 (JP) ................. 2007-015595

(51) Int. Cl.
*B60C 1/00* (2006.01)
*B60C 11/00* (2006.01)

(52) U.S. Cl.
USPC ............ 152/209.5; 152/209.8; 152/209.11

(58) Field of Classification Search
USPC .................. 152/209.5, 209.8, 209.11
See application file for complete search history.

(56) References Cited

U.S. PATENT DOCUMENTS

| | | | | |
|---|---|---|---|---|
| 5,829,503 A * | 11/1998 | Watkins et al. | ............ | 152/209.5 |
| 2003/0000616 A1 | 1/2003 | Watkins et al. | | |
| 2007/0137747 A1 * | 6/2007 | Yoshida | ............ | 152/209.5 |

FOREIGN PATENT DOCUMENTS

| | | | | |
|---|---|---|---|---|
| EP | 1 308 319 | A1 | | 5/2003 |
| JP | 03-125604 | A | | 5/1991 |
| JP | 03-125604 | A | * | 5/1991 |
| JP | 09-136504 | A | | 5/1997 |
| JP | 10-119513 | A | | 5/1998 |
| JP | 2001-47815 | A | | 2/2001 |
| JP | 2003-515487 | A | | 5/2003 |
| JP | 2006-273248 | A | | 10/2006 |
| WO | 00/37270 | A1 | | 6/2000 |

OTHER PUBLICATIONS

Supplementary European Search Report issued in European Application No. 08703534.1-2425/2106931 dated Aug. 3, 2010 (7 pages).
Chinese Office Action issued in the corresponding Chinese Application No. 200880003249.0 dated Feb. 3, 2012 with English translation.

* cited by examiner

*Primary Examiner* — Steven D Maki
(74) *Attorney, Agent, or Firm* — Sughrue Mion, PLLC

(57) ABSTRACT

The present invention realizes a pneumatic tire for a motorcycle, in which durability in running straight at a relatively high speed and tread surface gripping properties during high-speed cornering are made compatible and, in particular, a pneumatic tire for a motorcycle, which tire is capable of demonstrating appropriate durability and driving stability in accordance with inputs even if these inputs differ between running straight, cornering left and cornering right. The tread portion 3 is constituted of plural types of rubbers 11-13 adjacent to each other in the tire widthwise direction and sectioned into at least a center region A at the center portion of the tire including the tire equatorial plane and two side regions B1, B2 at respective sides of the tire. 300% modulus of rubber 11 constituting the center region is higher than 300% modulus of each of rubbers 12, 13 constituting the side regions, and 300% moduli of the rubbers constituting the side regions differ between one side region and the other side region.

3 Claims, 6 Drawing Sheets

PNEUMATIC TIRE FOR MOTORCYCLE

TECHNICAL FIELD

The present invention relates to a pneumatic tire for a motorcycle (which will occasionally be referred to simply as "tire" hereinafter), in particular, to a pneumatic tire for a motorcycle having improved tread rubber characteristics at side portions of the tire.

PRIOR ART

In recent years, racing motorcycles are increasingly requested to have higher output and speed capacities in accordance with the technological progress thereof. As a result, when such a motorcycle runs straight at a very high speed, a significant amount of heat is generated at the center portion of a tire, resulting in an extreme increase in temperature at the center portion and thus causing break of tread rubber thereat. In order to solve this problem, there has been attempted to improve durability of tread rubber.

On the other hand, in cornering, a motorcycle needs to have sufficient tread surface gripping force required for high speed cornering. However, in a case where a tread portion is entirely provided with the same rubber as that of the tire center portion having improved durability, sufficient gripping force cannot be demonstrated.

Examples of the technique related to improvement of a motorcycle tire include JP 03-125604 disclosing a technique for realizing a tire in which, as shown in FIG. 7, a tread portion is formed by one shoulder area S from a particular boundary point P to one outer edge Q1 and the remainder area O from the boundary point P to the other outer edge Q2 via an equatorial line C of a tire, the particular boundary point P being a position between the equatorial line C and the one outer edge Q1 where the distance between the equatorial line C and P is 0.15 to 0.35 times as long as the tread width as the distance in the tire axial direction between the one outer edge Q1 and the other outer edge Q2; and the one should area S and the remainder area O are formed of different rubbers, respectively, each rubber having a predetermined loss modulus of elasticity and loss-compliance, so that amounts of wear at the left hand side and the right hand side of the tire are made even and thus durability is improved in running public roads.

Further, in order to improve running performances in accordance with the form of a circuit racing course, JP 09-136504 discloses, as shown in FIG. 8, a tire for a motorcycle in which: a tread rubber is constituted of two tread portions extending from tread ends toward the tire equatorial line CL, respectively, and jointed with each other at the joint faces thereof; rubber base materials of different blend compositions are used for the respective tread portions; the joint width JW as the length along the tread surface between the both ends in the tire axial direction of the joint faces is set smaller than the tread width TW as the length along the tread surface between the respective tread ends; and an insertion ply having reinforcing cords is provided along the joint faces.

However, in such conventional pneumatic tires for motorcycles for use in racing, it is difficult to make sufficient durability in running straight at a relatively high speed with good gripping force of tread surface in cornering at a relatively high speed and there has been desired to establish a technology which can achieve these required performances in a compatible manner.

In a racing course or the like where input forms vary between the left hand side and the right hand side, in particular, it is especially desired that high speed cornering performances can be appropriately demonstrated in accordance with each input on the left hand side or the right hand side.

DISCLOSURE OF THE INVENTION

Problems to be Solved by the Invention

An object of the present invention is to solve the aforementioned problems by improving tread rubber and realize a pneumatic tire for a motorcycle, in which durability in running straight at a relatively high speed and tread surface gripping properties during high-speed cornering are made compatible. In particular, the present invention aims at providing a pneumatic tire for a motorcycle, which tire is capable of demonstrating appropriate durability and driving stability in accordance with inputs even if the inputs differ between running straight, cornering left and cornering right, respectively, as in racing.

Means for Solving the Problem

A pneumatic tire for a motorcycle according to a first aspect of the present invention has a pair of bead portions; a pair of sidewall portions extending from the bead portions; and a tread portion extending in a toroidal shape over the sidewall portions, wherein: the tread portion is constituted of plural types of rubbers adjacent to each other in the tire widthwise direction and sectioned into at least a center region at the center portion of the tire including the tire equatorial plane and two side regions at respective sides of the tire; 300% modulus of rubber constituting the center region is higher than 300% modulus of each of rubbers constituting the side regions, and 300% moduli of the rubbers constituting the side regions differ between one side region and the other side region.

The term "300% modulus" used in the present specification and claims thereof represents tensile stress at 300% elongation measured by carrying out a tensile test of a sample of JIS type-3 dumb-bell type according to HS K6251 at 100° C. at a rate of 500±25 mm/min.

Further, a pneumatic tire for a motorcycle according to a second aspect of the present invention has a pair of bead portions; a pair of sidewall portions extending from the bead portions; and a tread portion extending in a toroidal shape over the sidewall portions, wherein: the tread portion is constituted of plural types of rubbers adjacent to each other in the tire widthwise direction and sectioned into at least a center region at the center portion of the tire including the tire equatorial plane and two side regions at respective sides of the tire, one side region being sectioned into an intermediate portion adjacent to the center region and an edge portion disposed on the outer side thereof; 300% modulus of rubber constituting the center region is higher than 300% modulus of each of rubbers constituting the side regions, and 300% modulus of rubber of the intermediate portion differs from 300% modulus of rubber constituting the other side region.

Further, a pneumatic tire for a motorcycle according to a third aspect of the present invention has a pair of bead portions; a pair of sidewall portions extending from the bead portions; and a tread portion extending in a toroidal shape over the sidewall portions, wherein: the tread portion is constituted of plural types of rubbers adjacent to each other in the tire widthwise direction and sectioned into at least a center region at the center portion of the tire including the tire equatorial plane and two side regions at respective sides of the tire, each side region being sectioned into an intermediate portion adjacent to the center region and an edge portion disposed on the outer side thereof; 300% modulus of rubber constituting the center region is higher than 300% modulus of each of rubbers constituting the side regions, 300% moduli of rubbers of the respective intermediate portions are substantially the same or differ between one side region and the other side region, and 300% moduli of rubbers of the respective edge portions differ between one side region and the other side region.

Further, a pneumatic tire for a motorcycle according to a fourth aspect of the present invention has a pair of bead portions; a pair of sidewall portions extending from the bead portions; and a tread portion extending in a toroidal shape over the sidewall portions, wherein: the tread portion is constituted of plural types of rubber adjacent to each other in the tire widthwise direction and sectioned into at least a center region at the center portion of the tire including the tire equatorial plane and two side regions at respective sides of the tire, each side region being sectioned into a rubber at an intermediate portion adjacent to the center region and a rubber at an edge portion disposed on the outer side thereof; 300% modulus of rubber constituting the center region is higher than 300% modulus of each of rubbers constituting the side regions, 300% moduli of the rubbers of the respective intermediate portions differ between one side region and the other side region, and 300% moduli of the rubbers of the respective edge portions are substantially the same or differ between one side region and the other side region.

In the pneumatic tire for a motorcycle according to the third and fourth aspects of the present invention, it is preferable that regions occupied by the intermediate portions differ between one side region and the other side region.

Effect of the Invention

As a result of a keen study, the inventor of the present invention has discovered that, by disposing tread rubbers having appropriate characteristics at the tire center portion and the side portions of the tire, respectively, sufficient durability in running straight at a relatively high speed and good gripping properties of a tread surface during high speed cornering as described above can be made compatible with each other and thus, in particular, there can be obtained a pneumatic tire for a motorcycle, capable of demonstrating cornering performances in accordance with each input on the left hand side or the right hand side of the tire, to complete the present invention.

According to the present invention, there can be realized a pneumatic tire for a motorcycle, in which sufficient durability in running straight at a relatively high speed and good gripping properties of a tread surface during high speed cornering are made compatible with each other. In particular, it is possible to realize a pneumatic tire for a motorcycle, in which appropriate durability and driving stability in accordance with inputs and thus the maximum high speed cornering performances can be demonstrated even in a case where inputs to the tire differ between running straight and cornering left/right, for example, in racing.

According to the first aspect of the present invention, a pneumatic tire for a motorcycle can be realized, in which sufficient durability in running straight at a relatively high speed and good gripping properties of a tread surface during high speed cornering can be made compatible with each other by providing the center region constituting the tire center portion with a tread rubber having 300% modulus higher than that of each of the side regions for sufficient durability and providing each of the side regions with a tread rubber having 300% modulus lower than that of the center region for good gripping properties; and the tread rubber characteristics on the left hand side and the right hand side of the tire can be appropriately set, respectively, and excellent high speed cornering performances can be demonstrated in accordance with each input on the left hand side or the right hand side of the tire by differentiating 300% moduli of the rubbers constituting the two side regions between one side region and the other side region.

Further, according to the second aspect of the present invention, a pneumatic tire for a motorcycle can be realized, in which sufficient durability in running straight at a relatively high speed and good gripping properties of a tread surface during high speed cornering can be made compatible with each other by providing the center region with a rubber having 300% modulus higher than that of each of the side regions for sufficient durability and providing each of the side regions with a tread rubber having 300% modulus lower than that of the center region for good gripping properties; and the tread rubber characteristics on the left hand side and the right hand side of the tire can be appropriately set, respectively, and further better high speed cornering performances can be demonstrated in accordance with each input on the left hand side or the right hand side of the tire by differentiating 300% modulus of the rubber of the intermediate portion of one side region from 300% modulus of the rubber constituting the other side region.

Further, according to the third aspect of the present invention, a pneumatic tire for a motorcycle can be realized, in which sufficient durability in running straight at a relatively high speed and good gripping properties of a tread surface during high speed cornering can be made compatible with each other by providing the center region with a rubber having 300% modulus higher than that of each of the side regions for sufficient durability and providing each of the side regions with a tread rubber having 300% modulus lower than that of the center region for good gripping properties; and further better high speed cornering can be demonstrated in accordance with each input on the left hand side or the right hand side of the tire because 300% moduli of the rubbers of the respective intermediate portions are substantially the same or differ between one side region and the other side region and 300% moduli of rubbers of the respective edge portions differ between one side region and the other side region and thus the tread rubber characteristics on the left hand side and right hand side of the tire can be appropriately set.

Further, according to the fourth aspect of the present invention, a pneumatic tire for a motorcycle can be realized, in which sufficient durability in running straight at a relatively high speed and good gripping properties of a tread surface during high speed cornering can be made compatible with each other by providing the center region with a rubber having 300% modulus higher than that of each of the side regions for sufficient durability and providing each of the side regions with a tread rubber having 300% modulus lower than that of the center region for good gripping properties; and further better high speed cornering performances can be demonstrated in accordance with each input on the left hand side or the right hand side of the tire because 300% modulus of the rubber of the respective intermediate portions differ between one side region and the other side region and thus the tread rubber characteristics on the left hand side and right hand side of the tire can be appropriately set and 300% moduli of rubbers of the respective edge portions are substantially the same or differ between one side region and the other side region.

EXPLANATION OF REFERENCE NUMERALS

Figure 1:
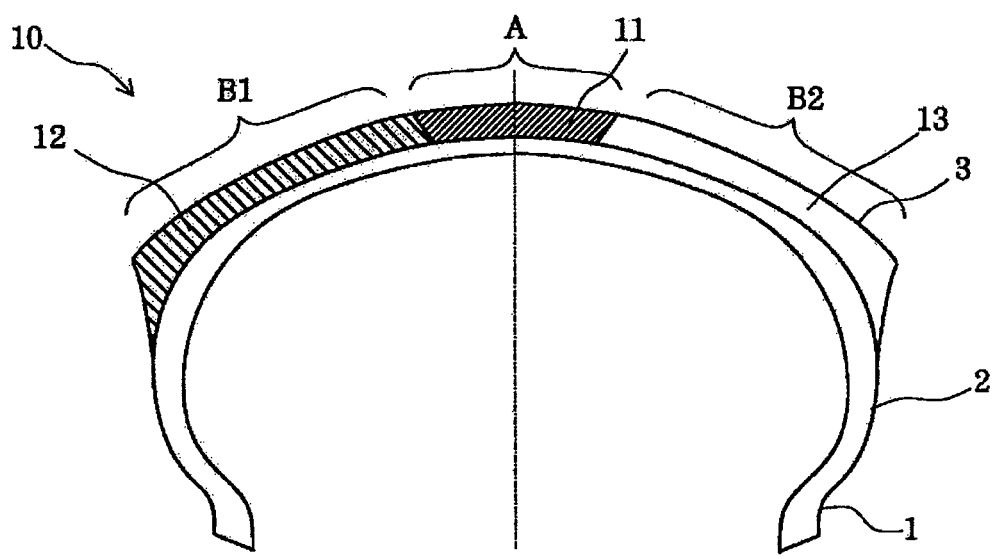
FIG. 1 is a schematic sectional view showing a pneumatic tire for a motorcycle according to a first embodiment of the present invention.

1 Bead portion
2 Sidewall portion
3 Tread portion
10, 20, 30 Pneumatic tire for motorcycle
11, 21, 31, 41, 51, 61, 71, 81, 91 Rubber constituting center region
12, 13, 23, 62, 72, 92 Rubber constituting side region
22a, 32a, 33a, 42a, 43a, 52a, 53a, 63a, 73a, 82a, 83a, 93a Rubber of intermediate portion
22b, 32b, 33b, 42b, 43b, 52b, 53b, 63b, 73b, 82b, 83b, 93b Rubber of edge portion
A Center region
B1, B2 Side region

BEST MODE FOR CARRYING OUT THE INVENTION

Hereinafter, a preferred embodiment of the present invention will be described in detail.

FIG. 1 shows a sectional view of a pneumatic tire 10 for a motorcycle according to a first embodiment of the present invention.

The tire 10 as shown has a pair of bead portions 1, a pair of sidewall portions 2 extending from the bead portions, and a tread portion 3 extending in a toroidal shape over the sidewall portions 2.

In the first embodiment of the present invention, as shown in FIG. 1, the tread portion 3 is constituted of plural types of rubbers 11 to 13 adjacent to each other in the tire widthwise direction and sectioned into at least a center region A at the center portion of the tire including the tire equatorial plane and two side regions B1, B2 at respective sides of the tire. Further, 300% modulus of the rubber 11 constituting the center region A is higher than 300% modulus of each of the rubbers 12, 13 constituting the side regions B1, B2 and 300% moduli of the rubbers 12, 13 constituting the side regions B1, B2 differ between one side region and the other side region of the tire.

In the tire 10 as shown in FIG. 1, the relationships between 300% moduli of the rubbers constituting the respective regions are: (300% modulus of the rubber 11 of the center region A)>(300% modulus of the rubber 12 of the side region B1)>(300% modulus of the rubber 13 of the side region B2). The rubbers of the side regions B1, B2 may be swapped with each other.

Figure 2:
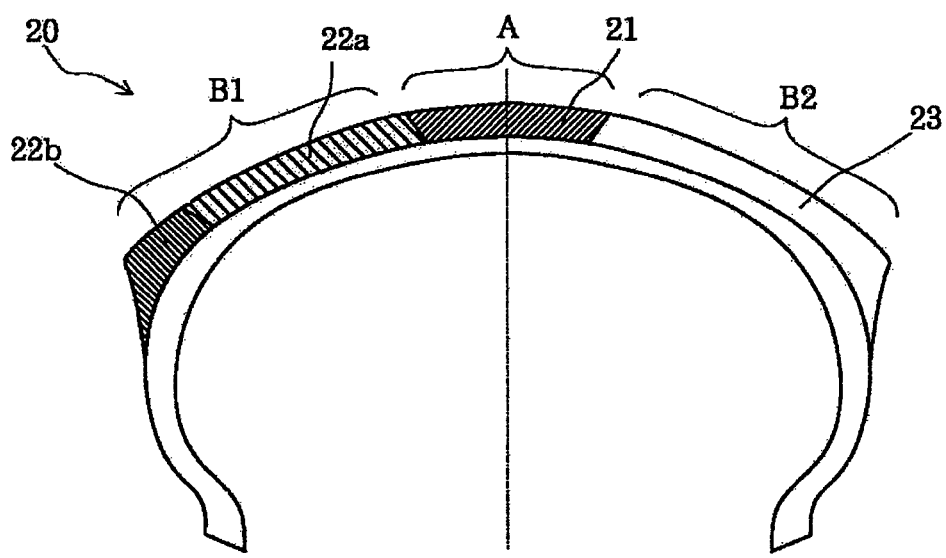
FIG. 2 is a schematic sectional view showing a pneumatic tire for a motorcycle according to a second embodiment of the present invention.

FIG. 2 shows a sectional view of a pneumatic tire 20 for a motorcycle according to a second embodiment of the present invention.

In the tire as shown, the tread portion is sectioned into at least a center region A at the center portion of the tire including the tire equatorial plane and two side regions B1, B2 at respective sides of the tire and one of the side regions B1 is sectioned into a rubber 22 at an intermediate portion adjacent to the center region A and a rubber 22b at an edge portion disposed on the outer side thereof.

In the second embodiment, 300% modulus of rubber 21 constituting the center region A is higher than 300% modulus of each of rubbers 22a, 22b, 23 constituting the side regions B1, B2, and 300% modulus of the rubber 22a of the intermediate portion differs from 300% modulus of the rubber 23 constituting the other side region B2.

In the structure described above, 300% modulus of the rubber 22b of the edge portion is not particularly restricted in terms of the relationship with the rubber 22a of the intermediate portion and the rubber 23 constituting the side region B2.

Figure 3:
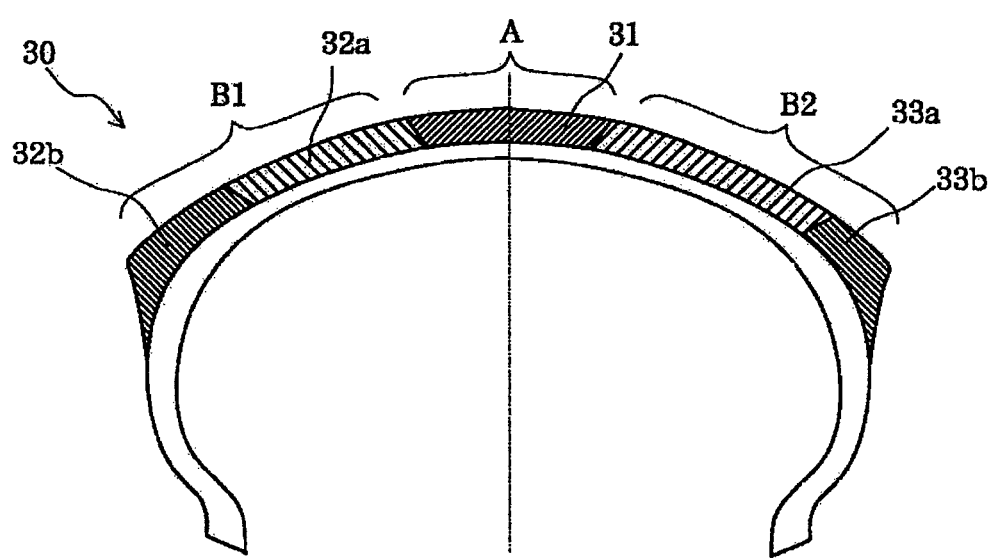
FIG. 3 a is schematic sectional view showing a pneumatic tire for a motorcycle according to a third embodiment of the present invention.

FIG. 3 shows a sectional view of a pneumatic tire 30 for a motorcycle according to a third embodiment of the present invention. In the tire 30, the tread portion is sectioned into at least a center region A at the center portion of the tire including the tire equatorial plane and two side regions B1, B2 at respective sides of the tire and each of the side regions B1, B2 is sectioned into a rubber 32a, 33a at an intermediate portion adjacent to the center region A and a rubber 32b, 33b at an edge portion disposed on the outer side thereof.

In the third embodiment, 300% modulus of rubber 31 constituting the center region A is higher than 300% modulus of each of rubbers 32a, 33a, 32b, 33b constituting the side regions B1, B2. Further, (1) 300% moduli of the rubbers 32a, 33a of the respective intermediate portions are substantially the same or differ between one side region and the other side region and 300% moduli of the rubbers 32b, 33b of the respective edge portions differ between one side region and the other side region; or (2) 300% moduli of the rubbers 32a, 33a of the respective intermediate portions differ between one side region and the other side region and 300% moduli of the rubbers 32b, 33b of the respective edge portions are substantially the same or differ between one side region and the other side region.

In the present invention, proportions of the center region A and the side regions B1, B2 are not particularly restricted. In order to ensure durability in running straight at a relatively high speed, it is preferable to set the width of the center region A at 0.15 to 0.35 times as wide as the tread width so that the side regions B1, B2 are not included in a tread region which is brought into contact with the ground when a vehicle mounted with the tire runs straight. Further, proportions of the intermediate portion and the edge portion in each side region are not particularly restricted and may be appropriately set in accordance with the tread rubber characteristics as desired. In a case where each of the side regions B1 and B2 is sectioned into an intermediate portion and an edge portion, proportions of the intermediate portion and the edge portion in one side region may either differ from (as shown in FIG. 3) or be the same as those in the other side region (not shown).

By differentiating the regions occupied by the intermediate portions between one side region and the other side region, better cornering at a relatively high speed can be achieved in accordance with an input on the left/right hand side of the tire.

Variations of the sectioned structure of the tread rubber according to the present invention are shown in FIGS. 4(a) to 4(f).

Figure 4:
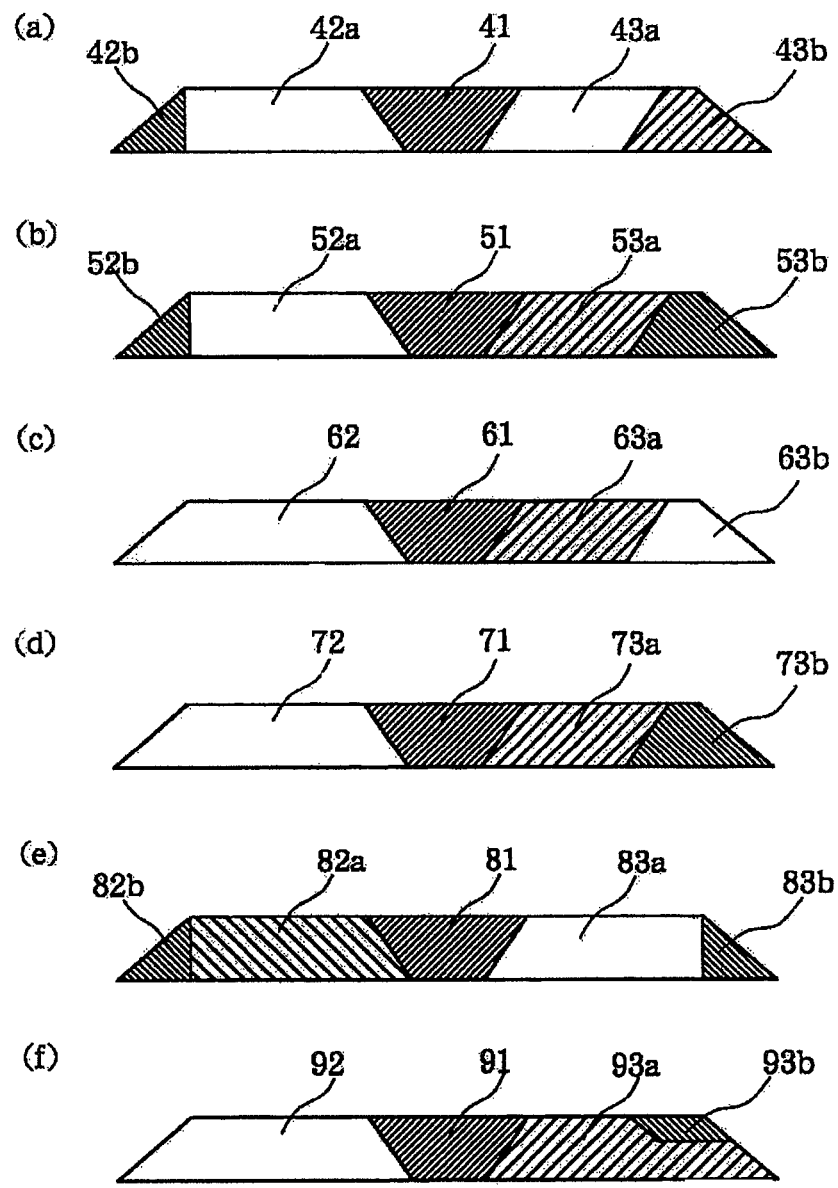
FIGS. 4(a) to 4(f) are schematic views showing tread rubbers of the pneumatic tire for a motorcycle according to a preferred embodiment of the present invention.

In a structure as shown in FIG. 4(a), each of the side regions is sectioned into a rubber 42a, 43a of the intermediate portion and a rubber 42b, 43b of the edge portion; proportions of the intermediate portion and the edge portion in each side region are differentiated between one side region and the other region; 300% moduli of the rubbers 42a, 43a of the intermediate portions are substantially the same; and 300% moduli of the rubbers 42b, 43b of the edge portions differ from each other.

Further, FIG. 4(b) shows a structure where each of the side regions is sectioned into a rubber 52a, 53a of the intermediate portions and a rubber 52b, 53b of the edge portions and proportions of the intermediate portion and the edge portion in each side region are differentiated between one side region and the other region. In the structure of FIG. 4(b), however, contrary to the structure of FIG. 4(a), 300% moduli of the rubbers 42a, 43a of the intermediate portions are differentiated and 300% moduli of the rubbers 42b, 43b of the edge portions are substantially the same.

Yet further, FIG. 4(c) shows a structure where only one side region is sectioned into an intermediate portion and an edge portion; 300% modulus of the rubber 62 constituting the other side region differs from 300% modulus of the intermediate portion 63a; and 300% modulus of the rubber 62 constituting the other side region is substantially the same as 300% modulus of the rubber 63b of the edge portion. A structure shown in FIG. 4(d) is similar to the structure of FIG. 4(c), except that in the FIG. 4(d) structure 300% modulus of rubber 72 constituting the other side region differs from 300% modulus of rubber 73b of the edge portion.

Yet further, FIG. 4(e) shows a structure where 300% moduli of rubbers 82a, 83a of the intermediate portions differ from each other; 300% moduli of rubbers 82b, 83b of the edge portions are substantially the same; and the proportion of the edge portion in one side region is the same as the proportion of the edge portion in the other side region. A structure shown in FIG. 4(f) is similar to the structure of FIG. 4(d), except that in the FIG. 4(f) structure a rubber 93a of the intermediate portion is provided with a rubber 93b as an edge portion laminated thereon. It should be noted that any of the sectioned structures described above may be modified, in use, to have the side region on the left hand side thereof swapped with the other side region on the right hand side.

As described above, a pneumatic tire for a motorcycle of the present invention is capable of demonstrating excellent cornering performance at a relatively high speed in accordance with an input on the left/right hand side of the tire. In particular, the tire is preferably used for a racing motorcycle and the like, used in a racing course where inputs exerted on the tire vary between the left hand side and the right hand side.

In the present invention, the sectioned structures of a tread rubber as described above constitute the critical features thereof and details of the tire structure, materials of the tire and the like other than these critical features are not particularly restricted.

For example, at least one carcass ply (not shown) is provided to extend in a toroidal shape via a sidewall portion 2 and a tread portion 3 over a pair of beads 1, and at least one belt layer is provided on the outer side in the tire radial direction of a crown portion of the carcass ply. Further, a bead core is embedded in each bead portion 1 and respective ends of the carcass ply are folded around the respective bead cores from the inner side toward the outer side of the tire, to be held thereon. Appropriate tread patterns are formed at a surface of the tread portion 3 and an inner liner is formed as the innermost layer of the structure.

EXAMPLES

The present invention will be described in detail by examples hereinbelow. Test tires were produced by sectioning the tread portion into a center region A and side regions B1, B2 and constituting the regions of different rubbers, respectively, as shown in Table 1 below. The values of 300% modulus in Table 1 are relative index values, in which 6.5 MPa as 300% modulus of the center region A of Example 1 is expressed as 100. The larger index values represent the larger modulus.

Further, each of the test tires had tire size of 190/65OR16.5 and was evaluated as a slick tire.

TABLE 1

Figure 5:
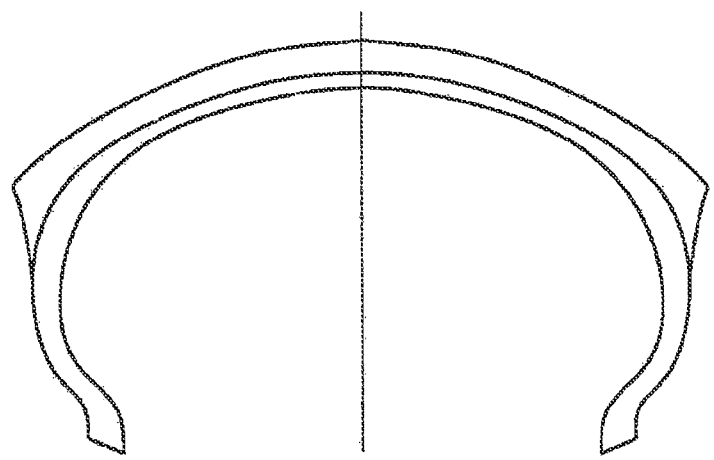
FIG. 5 is a schematic sectional view showing a pneumatic tire for a motorcycle according to Conventional example 1.
Figure 6:
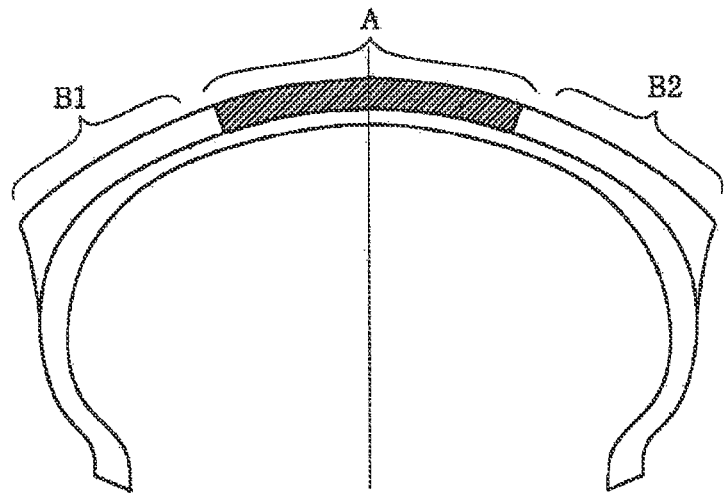
FIG. 6 is a schematic sectional view showing a pneumatic tire for a motorcycle according to Conventional example 2.
Figure 7:
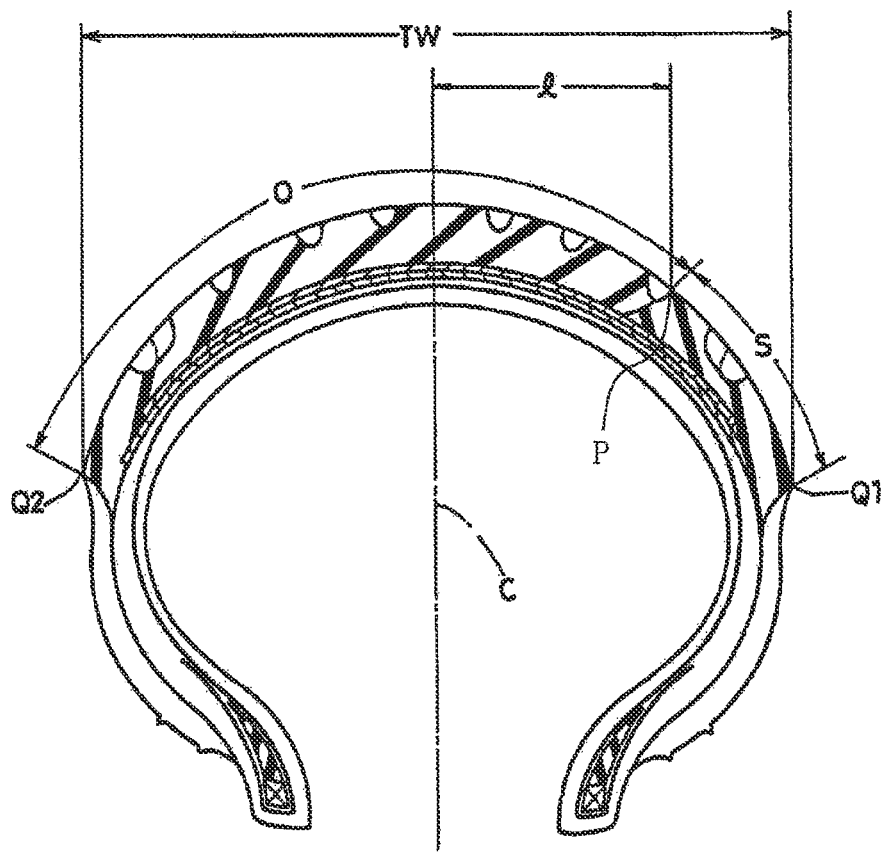
FIG. 7 is a schematic sectional view showing a pneumatic tire for a motorcycle according to JP 03-125604.
Figure 8:
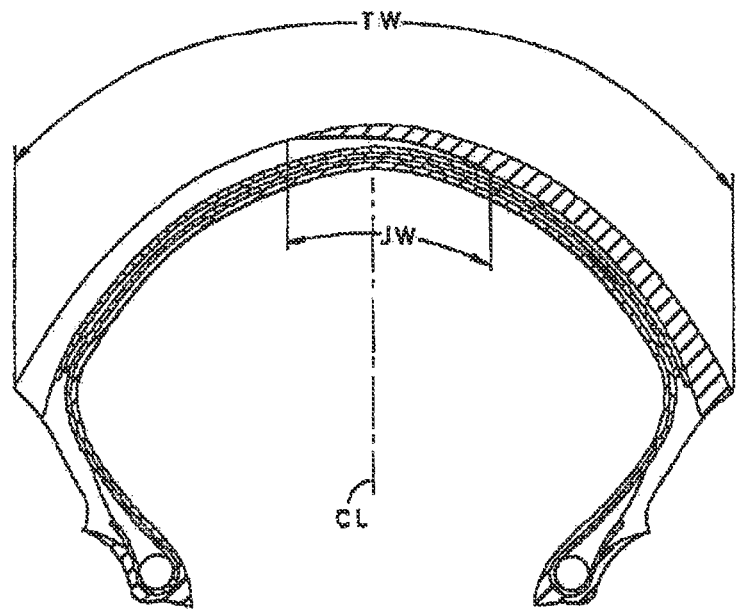
FIG. 8 is a schematic sectional view showing a pneumatic tire for a motorcycle according to JP 09-136504.

| | | | 300% modulus (100° C.) (index value) | | | |
| | | | Side region B1 | | Side region B2 | |
| | Corresponding drawing | Center region A | Rubber of intermediate portion | Rubber of edge portion | Rubber of intermediate portion | Rubber of edge portion |
|---|---|---|---|---|---|---|
| Example 1 | FIG. 1 | 100 | | 65 | | 75 |
| Example 2 | FIG. 2 | 100 | 65 | 50 | | 75 |
| Example 3 | FIG. 3 | 100 | 65 | 50 | 75 | 60 |
| Conventional Example 1 | FIG. 5 | 75 | | 75 | | 75 |
| Conventional Example 1 | FIG. 6 | 100 | | 75 | | 75 |

Each of the test tires thus obtained was mounted to a 1000 cc racing motorcycle and was evaluated by actual running in a circuit where an input on the right hand side of the tire was relatively severe.

Evaluations were made by feelings felt by a professional rider with respect to four items, i.e. stability in running straight at a relatively high speed, performance in cornering left, performance in cornering right and durability at a relatively high speed, with ten scores as the full score. In any evaluation item, the larger score represents the higher evaluation. The results of the evaluation are show in Table 2.

TABLE 2

|  | Example 1 | Example 2 | Example 3 | Conventional Example 1 | Conventional Example 2 |
|---|---|---|---|---|---|
| Stability in running straight at a relatively high speed | 7 | 7 | 7 | 5 | 7 |
| performance in cornering left | 5 | 5 | 6 | 5 | 5 |
| performance in cornering right | 6 | 7 | 7 | 4 | 4 |
| Durability at a relatively high speed | 8 | 8 | 8 | 5 | 8 |

As shown in the results of Table 2, it is confirmed that the respective test tires of the foregoing embodiments, in which the tread rubber has the predetermined sectioned structures, exhibit well-balanced high performances in all of the evaluation items, i.e. stability in running straight at a relatively high speed, performance in cornering left, performance in cornering right and durability at a relatively high speed, as compared with Conventional Examples 1 and 2. Therefore, it is understood that, in the present invention, there can be obtained a pneumatic tire for a motorcycle in which, by appropriately designing division patterns of tread rubber in accordance with the state of inputs, durability in running straight at a relatively high speed and gripping properties in cornering at a relatively high speed can be made compatible even if inputs differ between on the left hand side and the right hand side of the tire, whereby appropriate durability and driving stability can be demonstrated in accordance with inputs.

The invention claimed is:

1. A pneumatic tire for a motorcycle having a pair of bead portions; a pair of sidewall portions extending from the bead portions; and a tread portion extending in a toroidal shape over the sidewall portions, characterized in that:
    the tread portion is constituted of plural types of rubbers adjacent to each other in the tire widthwise direction and sectioned into at least a center region at the center portion of the tire including the tire equatorial plane and two side regions at respective sides of the tire;
    only one side region being sectioned into an intermediate portion adjacent to the center region and an edge portion disposed on the outer side thereof;
    300% modulus of rubber of the intermediate portion of the one side region differs from 300% modulus of rubber constituting the other side region;
    the tread portion is asymmetric with respect to the tire equatorial plane in 300% modulus distribution thereof; and
    300% modulus of rubber constituting the center region is higher than 300% modulus of each of rubbers constituting the side regions.

2. A pneumatic tire for a motorcycle having a pair of bead portions; a pair of sidewall portions extending from the bead portions; and a tread portion extending in a toroidal shape over the sidewall portions, characterized in that:
    the tread portion is constituted of plural types of rubbers adjacent to each other in the tire widthwise direction and sectioned into at least a center region at the center portion of the tire including the tire equatorial plane and two side regions at respective sides of the tire;
    each side region being sectioned into an intermediate portion adjacent to the center region and an edge portion disposed on the outer side thereof;
    proportions of the intermediate portion and the edge portion in each side region are differentiated between one side region and the other region;
    300% moduli of the rubbers (42b, 43b) of the edge portions differ from each other;
    the tread portion is thus asymmetric with respect to the tire equatorial plane 300% modulus distribution thereof; and
    300% modulus of rubber constituting the center region is higher than 300% modulus of each of rubbers constituting the side regions.

3. A pneumatic tire for a motorcycle having a pair of bead portions; a pair of sidewall portions extending from the bead portions; and a tread portion extending in a toroidal shape over the sidewall portions, characterized in that:
    the tread portion is constituted of plural types of rubber adjacent to each other in the tire widthwise direction and sectioned into at least a center region at the center portion of the tire including the tire equatorial plane and two side regions at respective sides of the tire;
    each side region being sectioned into a rubber at an intermediate portion adjacent to the center region and a rubber at an edge portion disposed on the outer side thereof;
    proportions of the intermediate portion and the edge portion in each side region are differentiated between one side region and the other region;
    300% moduli of the rubbers (52a, 53a) of the intermediate portions differ from each other;
    the tread portion is thus asymmetric with respect to the tire equatorial plane 300% modulus distribution thereof; and
    300% modulus of rubber constituting the center region is higher than 300% modulus of each of rubbers constituting the side regions.

* * * * *